United States Patent
Shen et al.

(10) Patent No.: US 8,077,434 B1
(45) Date of Patent: Dec. 13, 2011

(54) PERPENDICULAR MAGNETIC RECORDING HEAD HAVING A RECESSED MAGNETIC BASE LAYER

(75) Inventors: Yong Shen, Saratoga, CA (US); Lei Larry Zhang, San Jose, CA (US); Yingjian Chen, Fremont, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1018 days.

(21) Appl. No.: 11/942,113

(22) Filed: Nov. 19, 2007

(51) Int. Cl.
*G11B 5/147* (2006.01)
(52) U.S. Cl. .............................. 360/125.12; 360/125.08
(58) Field of Classification Search . 360/125.02–125.32
See application file for complete search history.

(56) References Cited

U.S. PATENT DOCUMENTS

| | | | |
|---|---|---|---|
| 5,805,391 A | 9/1998 | Chang et al. | |
| 6,282,056 B1 | 8/2001 | Feng et al. | |
| 6,306,311 B1 | 10/2001 | Han et al. | |
| 6,337,783 B1 | 1/2002 | Santini | |
| 6,469,874 B1 | 10/2002 | Han et al. | |
| 6,490,125 B1 | 12/2002 | Barr | |
| 6,504,677 B1 | 1/2003 | Han et al. | |
| 6,583,966 B2 | 6/2003 | Han et al. | |
| 6,608,737 B2 | 8/2003 | Han et al. | |
| 6,612,017 B2 | 9/2003 | Santini | |
| 6,657,816 B1 | 12/2003 | Barr et al. | |
| 6,826,015 B2 | 11/2004 | Chen et al. | |
| 7,113,366 B1 | 9/2006 | Wang et al. | |
| 7,130,153 B2 | 10/2006 | Shen et al. | |
| 7,889,456 B2 * | 2/2011 | Jiang et al. | 360/125.08 |
| 2002/0030929 A1 | 3/2002 | Sasaki | |
| 2005/0047011 A1 | 3/2005 | Han et al. | |
| 2005/0219747 A1 | 10/2005 | Hsu et al. | |
| 2005/0259357 A1 | 11/2005 | Kameda | |

* cited by examiner

*Primary Examiner* — A. J. Heinz

(57) ABSTRACT

A method and system for providing a magnetic transducer having an air-bearing surface (ABS) are described. The magnetic transducer includes a base layer, a perpendicular magnetic recording (PMR) pole on the base layer, an additional pole, a write shield, a write gap between the PMR pole and a portion of the write shield, and coil(s) that energize at least the additional pole. The base layer includes a first portion proximate to the ABS and a second portion recessed from the ABS. The first portion is nonmagnetic, while the second portion is magnetic. The PMR pole has a first front portion proximate to the ABS. The additional pole has a second front portion recessed from the ABS. At least a portion of the additional pole resides between the PMR pole and write shield. At least a portion of the write gap resides on the front portion of the PMR pole.

16 Claims, 6 Drawing Sheets

PERPENDICULAR MAGNETIC RECORDING HEAD HAVING A RECESSED MAGNETIC BASE LAYER

BACKGROUND

In order to write data to and read data from a media, a recording head is typically used. FIG. 1 depicts a conventional perpendicular magnetic recording (PMR) head 10 that includes a read transducer 12 and a conventional write transducer 14. For clarity, FIG. 1 is not drawn to scale. Although both the conventional read transducer 12 and the conventional write transducer 14 are shown, the conventional write transducer 14 may be part of a head that only performs writing. In addition, the conventional PMR head 10 may also include a slider (not shown).

The read transducer 12 includes a first shield (S1) 15, a read sensor 16, and a second shield (S2) 18. The conventional PMR write transducer 14 includes a first pole 20 that may be separate from the S2 18, a first coil 22, a conventional PMR pole 24, a second pole (P2) 26, an insulating space 28, a write gap 30, a conventional write shield 32 that may include portions 32A and 32B, and a second coil 34. The conventional write shield 32 perpendicular to the ABS that is on the order of thirteen to sixteen micrometers. Although not explicitly shown, seed layer(s) may be used in providing the conventional poles 22, 24, and 26. The conventional PMR write transducer 14 is also depicted with two coils 26 and 34. However, PMR heads having a single coil are also typically used. In addition, the throat height (TH) and shield height (SH) are also shown.

In order to write data to a PMR media, the coils 26 and 34 are energized. Consequently, the conventional P2 26 and conventional PMR pole 24 are magnetized and the media written by flux from the pole tip of the conventional PMR pole 24. Based on the direction of current through the coils 26 and 34, the direction of magnetic flux through the conventional PMR pole 24 changes. Thus, bits having opposing magnetization can be written and the desired data stored on the PMR media.

Although the conventional PMR head 10 functions, there may be drawbacks, particularly in adapting the conventional PMR head 10 to higher densities. In particular, the conventional PMR head 10 may have poor write efficiency at hither densities. In the conventional PMR head 10, the P2 26, or yoke, is at the top of the conventional PMR pole 24 and the insulating spacing 28 typically has a depth, d, of at least one micron. This depth is sufficient to ensure that the fabrication of the conventional PMR head 10 may be performed with sufficient process margins. For example, the P2 26 and write shield portion 32A may be formed from the same material and at the same time. The insulator 28 might be formed by removing a portion of this material, refilling using an insulator, and performing a planarization. In order to ensure that this can be accomplished with sufficient yield, the P2 26 is placed at least one micron from the back of the write shield portion 32A. Stated differently, the depth, d, is at least one micron. When the conventional PMR head 10 is scaled to higher densities, the thickness of the poles 24 and 26 may be reduced. Despite its reduced thickness, the P2 26 is still spaced from the back of the write shield portion 32A by at least one micron. As a result, the write efficiency of the conventional PMR head 10 may be reduced.

Accordingly, what is needed is a system and method for improving the write efficiency of a PMR head, particularly at higher densities.

BRIEF SUMMARY OF THE INVENTION

A method and system for providing a magnetic transducer having an air-bearing surface (ABS) are described. The magnetic transducer includes a base layer, a perpendicular magnetic recording pole on the base layer, an additional pole, a write shield, a write gap between the perpendicular magnetic recording pole and a portion of the write shield, and at least one coil that energize at least the additional pole. The base layer includes a first portion proximate to the ABS and a second portion recessed from the ABS. The first portion is nonmagnetic, while the second portion is magnetic. The perpendicular magnetic recording pole has a first front portion proximate to the ABS. The additional pole has a second front portion recessed from the ABS. At least a portion of the additional pole resides between the perpendicular magnetic recording pole and the write shield. At least a portion of the write gap resides on the front portion of the perpendicular magnetic recording pole

DETAILED DESCRIPTION OF THE PREFERRED EMBODIMENTS

Figure 1:
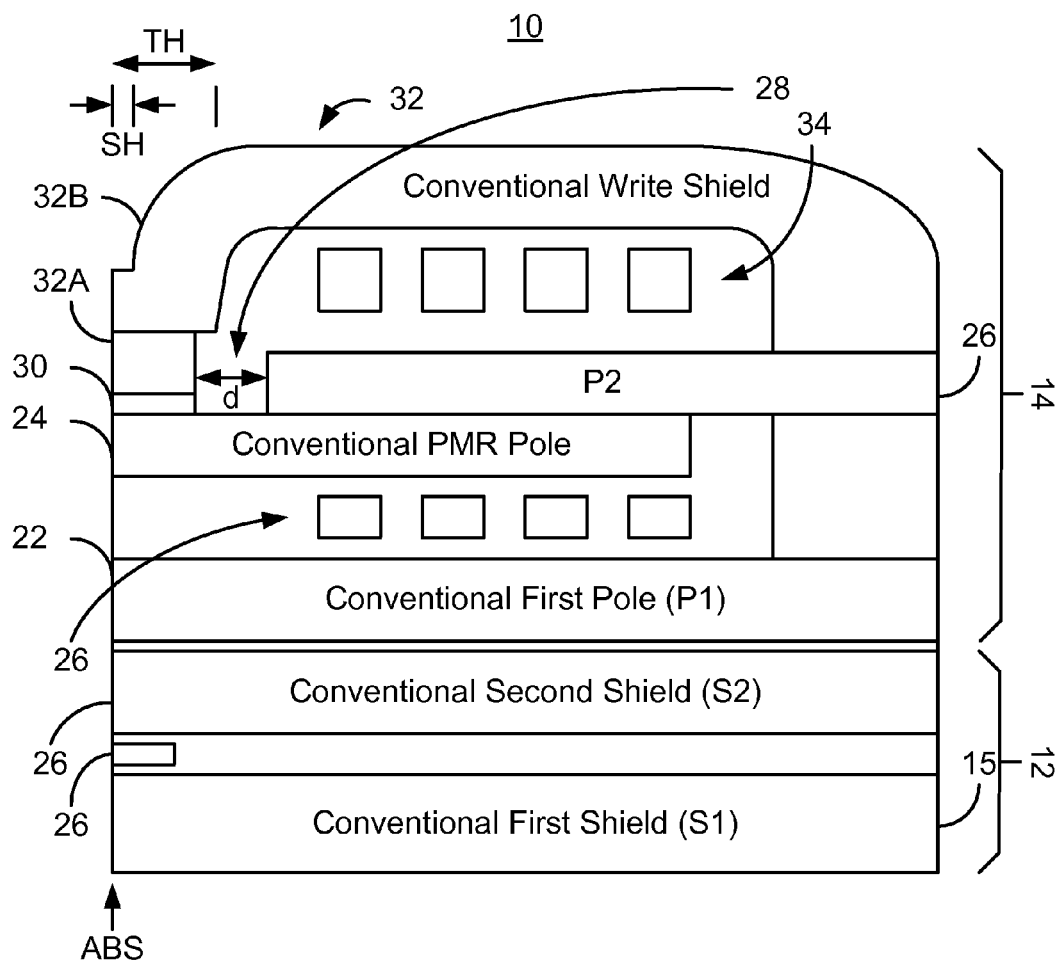
FIG. 1 depicts a conventional PMR write head.
Figure 2:
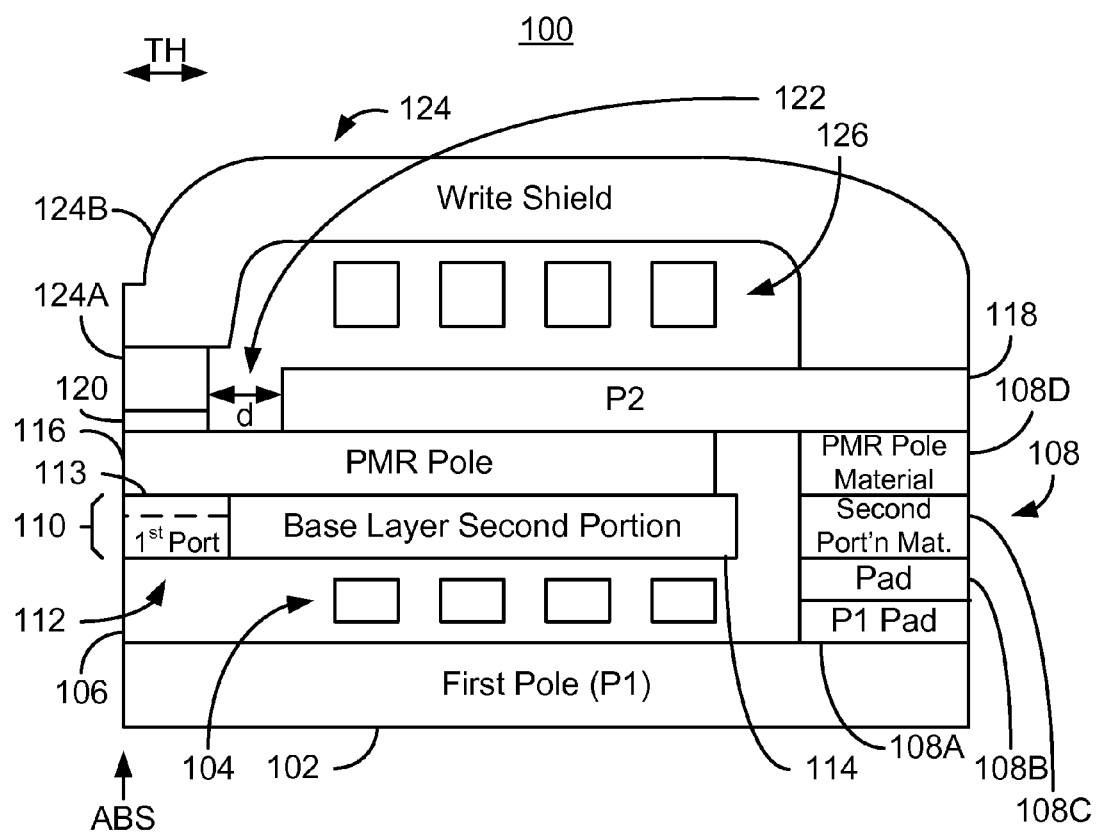
FIG. 2 is a diagram depicting an exemplary embodiment of a PMR transducer.

FIG. 2 is a diagram depicting an exemplary embodiment of a PMR transducer 100. The PMR transducer 100 includes at least a first pole (P1) 102, a first coil 104, an insulator 106, optional pads 108, a base layer 110, a PMR pole 116, a second pole (P2) 118, a write gap 120, an insulator 122, a write shield 124, and a second coil 126. For clarity, the PMR transducer 100 is not drawn to scale. Although shown alone, the PMR transducer 100 may be part of a head that includes a slider and may also include a read transducer (not shown).

The P1 102 and PMR pole 116 are ferromagnetic and, therefore, may include materials such as Fe, Ni, and Co. The pad 108 may include structure formed at different times. For example, the pad 108 may include a P1 pad 108A, an additional pad 108B connecting the P1 pad to a portion 108C of the pad formed with the second portion 114 of the base layer 110, the portion 108C of the pad 108 formed with the second portion 114 of the base layer 110, and a portion 108D of the pad 108 formed along with the PMR pole 116. The PMR pole 116 extends from the ABS, past the front of the P2 118. Thus, the P2 118 and the PMR pole 116 overlap. In addition, the PMR pole 116 resides on the base layer 110.

The base layer 110 includes at least two portions 112 and 114. The first portion 112 is proximate to the ABS. In the embodiment shown, the first portion 112 extends from the ABS to the second portion 114. In addition, the first portion 112 of the base layer 110 is nonmagnetic. In one embodiment, the first portion 112 is conductive, for example including a transition metal. In another embodiment, the first portion 112 is insulating. For example, the first portion 112 of the base layer 110 may include at least one of NiP, NiNb, CoB, NiCr, Ru, and AlOx. The first portion 112 of the base layer 110 may also include a chemical mechanical planarization (CMP) stop layer 113. The CMP stop layer 113 is shown with a dashed line because the CMP stop layer 113 is optional. In one embodiment, the CMP stop layer includes at least one of Cr, Ta, Ru, and diamond-like carbon.

In contrast to the first portion 112, the second portion 114 of the base layer 110 is recessed from the ABS. In one embodiment, the second portion 114 of the base layer 110 is recessed by not more than one micron. For example, in one embodiment, the second portion 114 of the base layer 110 may be recessed not more than two hundred and fifty nanometers. The second portion 114 is also magnetic. Thus, the second portion 114 of the base layer 110 may include at least one of Fe, Co, Ni, and CoFe. In one embodiment, the second portion 114 of the base layer 110 has a high saturation magnetization. For example, the second portion 114 of the base layer 110 may have a saturation magnetization of at least one Tesla. In one embodiment, the saturation magnetization of the second portion 114 of the base layer 110 is not more than 2.5 Tesla.

The P2 118 is recessed from the ABS and magnetic. The P2 118 may thus include materials such as Fe, Ni, and Co. The write shield 124 may also be magnetic and may be viewed as having two portions 124A and 124B that may be formed separately. The P2 118 is separated from a back of the portion 124A of the write shield 124 by a distance, d. In one embodiment, the distance d is on the order of one micron. However, in another embodiment, the distance d may be greater, including more than one micron.

As discussed above, the second portion 114 of the base layer 110 is recessed from the ABS. However, the front of the second portion 114 resides between the back of the first portion 112 and the front of the P2 118. Stated differently, the front of the second portion 114 resides between the ABS and the front of the P2 118. In one embodiment, the front of the second portion 114 resides between the back of the portion 124A of the write shield and the P2 118. The second portion 114 may be closer to the ABS than the P2 118 because the second portion 114 is adjacent to the first portion 112. Thus, the insulator 122 present between the write shield portion 124A and the P2 118 is not present for the base layer 110. As a result, manufacturing issues relating to removal of a middle portion of a layer and refilling may be reduced or eliminated. Consequently, the second portion 114 of the base layer 112 may be closer to the ABS.

The PMR transducer 100 is also shown as including coils 104. The coils 104 and 126 may be used to energize the PMR pole 116 and P2 118. Although two coils 104 and 126 are shown, the PMR transducer 100 may include another number of coils.

In operation, the coils 104 and 126 are energized. Consequently, the PMR pole 116, P2 118, and second portion 114 of the base layer 110 are magnetized. The media (not shown), may then be written by flux from the pole tip of the PMR pole 116. Based on the direction of current through the coils 104 and 126, the direction of magnetic flux through the PMR pole 116 changes. Thus, bits having opposing magnetization can be written and the desired data stored on the PMR media.

As discussed above, the second portion 114 of the base layer 110 may be magnetized during writing using the PMR transducer 100. In addition, the front of the second portion 114 of the base layer may be significantly less than one micron from the ABS. In one embodiment, therefore, the second portion 114 may be closer to the ABS than the P2 118. As a result, the base layer 110 may significantly aid in transferring flux to the PMR pole 116, particularly the tip of the PMR pole 116. Because the efficiency of flux transfer to the PMR pole 116 may be improved, writeability of the PMR transducer 100 may be improved. In particular, the PMR transducer 110 may have sufficient writeability even at higher densities at which thicknesses of the poles 102, 116, and/or 118 are reduced. Consequently, performance of the PMR transducer 100 may be improved.

Figure 3:
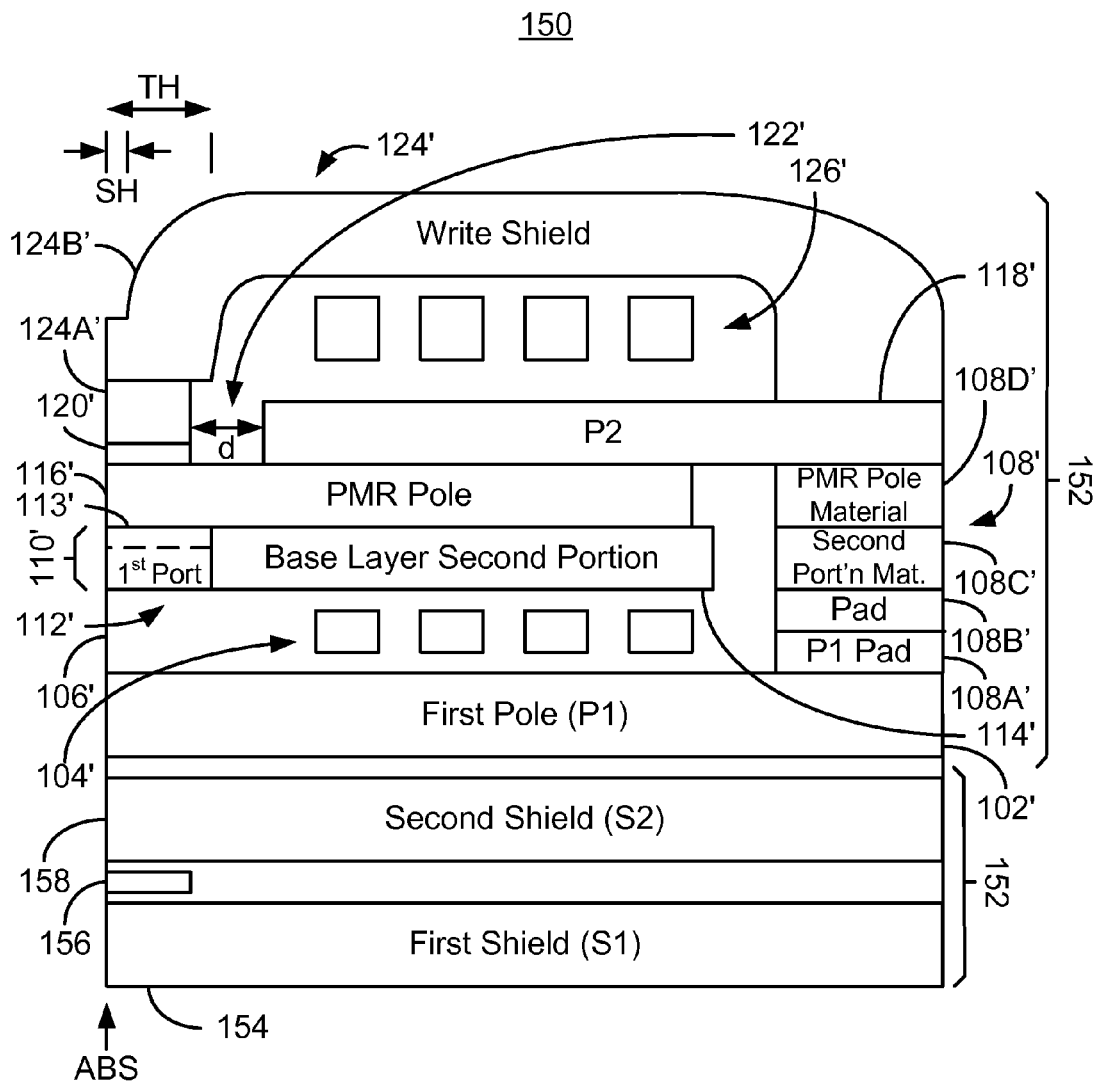
FIG. 3 is a diagram depicting an exemplary embodiment of a PMR head.

FIG. 3 is a diagram depicting an exemplary embodiment of a PMR head 150. For clarity, the PMR head 150 is not drawn to scale. The PMR head 150 is a merged head including a read transducer 152, a PMR write transducer 100', and a slider (not shown). The read transducer 152 includes a first shield 154, a read sensor 156, and a second shield 158. In one embodiment, the read sensor is a magnetoresistive sensor, such as a spin valve or magnetic tunneling junction. However, in another embodiment, the read sensor could be another structure.

The PMR transducer 100' is analogous to the PMR transducer 100. Consequently, portions of the PMR transducer 100' are labeled similarly to the PMR transducer 100 depicted in FIG. 2. Referring back to FIG. 3, the PMR transducer 100' thus includes at least a P1 102', a first coil 104', an insulator 106', pads 108', a base layer 110', a PMR pole 116', a P2 118', a write gap 120', an insulator 122', a write shield 124', and a second coil 126'. Although the P1 102' and second shield 158 are shown as separate structure, in one embodiment, they may be combined. The P1 102', first coil 104', insulator 106', pads 108', base layer 110', PMR pole 116', P2 118', write gap 120', insulator 122', write shield 124', a second coil 126' may have an analogous structure and function to that discussed previously.

As in the PMR transducer 100, the base layer 110' includes at least two portions 112' and 114'. The first portion 112' is proximate to the ABS and nonmagnetic. In one embodiment, the first portion 112' is conductive, for example including a transition metal. In another embodiment, the first portion 112' may be insulating. For example, the first portion 112' may include at least one of NiP, NiNb, CoB, NiCr, Ru, and AlOx. The first portion 112' may also include a CMP stop layer 113' such as at least one of Cr, Ta, Ru, and diamond-like carbon.

In addition, the second portion 114' is recessed from the ABS and magnetic. In one embodiment, the second portion 114' is recessed by not more than one micron. For example, in one embodiment, the second portion 114' may be recessed not more than not more than two hundred and fifty nanometers. The second portion 114' is also magnetic. Thus, the second portion 114' may include at least one of Fe, Co, Ni, and CoFe. In one embodiment, the second portion 114' has a high saturation magnetization, for example of at least one Tesla. In one embodiment, the saturation magnetization of the second portion 114' is not more than 2.5 Tesla.

In operation, the coil(s) 104' and 126' are energized. Consequently, the PMR pole 116', P2 118', and second portion 114' are magnetized. The media (not shown), may then be written by flux from the pole tip of the PMR pole 116'. Based on the direction of current through the coils 104' and 126', the direction of magnetic flux through the PMR pole 116' changes.

As discussed above, the base layer 110' includes the second portion 114' that is magnetic and may be significantly less than one micron from the ABS. The second portion 114' of the base layer 110' may thus be closer to the ABS than the P2 118'. The second portion 114' may also aid in transferring flux to the tip of the PMR pole 116'. Thus, writeability of the PMR head 150 may be improved. In particular, the PMR head 150 may be used even at higher densities having reduced thicknesses of the poles 102, 116, and/or 118. Consequently, performance of the PMR transducer 100 may be improved. This improvement may be achieved without sacrificing manufacturability because issues relating to removal of a middle portion of a layer and refilling may be avoided for the second portion 114' of the base layer 110.

Figure 4:
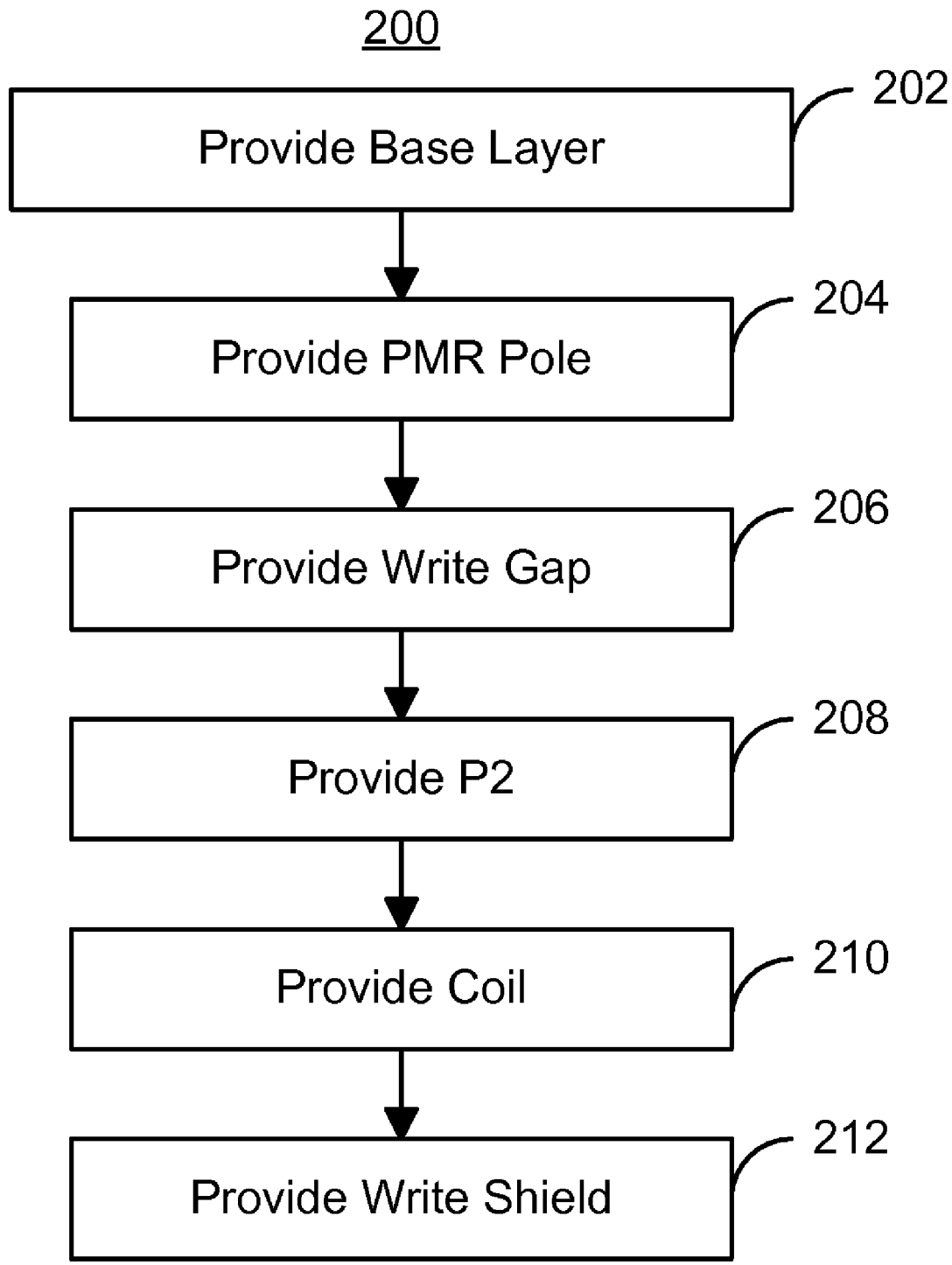
FIG. 4 is a flow-chart depicting an exemplary embodiment of a method for providing a PMR transducer.

FIG. 4 is a flow-chart depicting an exemplary embodiment of a method 200 for providing a PMR transducer. For clarity, the method 200 is described in the context of the PMR transducer 100. For simplicity, some steps of the method 200 may be omitted or combined. Referring to FIGS. 2 and 4, the method 200 commences after formation of the P1 102, coil 104, and insulator 106.

The base layer 110 is provided, via step 202. Step 202 includes forming the first portion 112 that is nonmagnetic and the second portion 114 that is magnetic and recessed from the ABS by not more than one micron. In one embodiment, step 202 includes ensuring that the second portion 114 is not more than two hundred and fifty nanometers from the ABS. In one embodiment, step 202 includes forming the first portion 112 of material(s) layer including at least one of NiP, NiNb, CoB, NiCr, Ru, and AlOx. In one embodiment, step 202 includes providing a CMP stop layer, such as at least one of at least one of Cr, Ta, Ru, and diamond-like carbon, in the first portion 112 of the base layer 110. Step 202 may also include forming the second portion 114 of the base layer 110 of material(s) having a high saturation magnetization, for example materials including at least one of Fe, Co, Ni, and CoFe. In one embodiment, the second portion 114 is fabricated in step 202 such that the saturation magnetization is not more than 2.5 Tesla.

The PMR pole 116 is provided on the base layer 110, via step 204. The write gap 120 is provided near the ABS surface, or pole tip, of the PMR pole 116, via step 206. The P2 118 is provided, via step 208. Step 208 includes providing the P2 118 recessed from the ABS and such that at least a portion of the P2 118 resides on the PMR pole 116. In one embodiment, step 208 also includes providing the portion 124A of the write shield 124. In one embodiment, step 208 includes providing a mask on the PMR transducer 100 after formation of the PMR pole 116. A portion of the mask covers a portion of the magnetic transducer 100 between the ABS and the desired location of the P2 118. In such an embodiment, step 208 includes depositing material(s) for the P2 118 from at least the ABS to at least a desired location of the back of the additional pole. Step 208 would also include lifting off the mask. Consequently, a first remaining portion of the material(s) proximate to the ABS would the portion 124A of the write shield 124, while a second remaining portion of the material would form the P2 118.

The coil 126 is provided, via step 210. In one embodiment, step 210 also includes insulating the coil 126 such that electrical contact is not made between the P2 118 and the coil 126 and between the write shield 124 and the coil 126. The write shield 124 is provided, via step 212. In one embodiment, step 212 includes providing the portion 124B of the write shield.

Thus, using the method 200, a write transducer, such as the write transducer 100 may be provided. Consequently, the method 200 may be used to fabricate a write transducer having improved write efficiency and that is better able to be used at higher densities.

Figure 5:
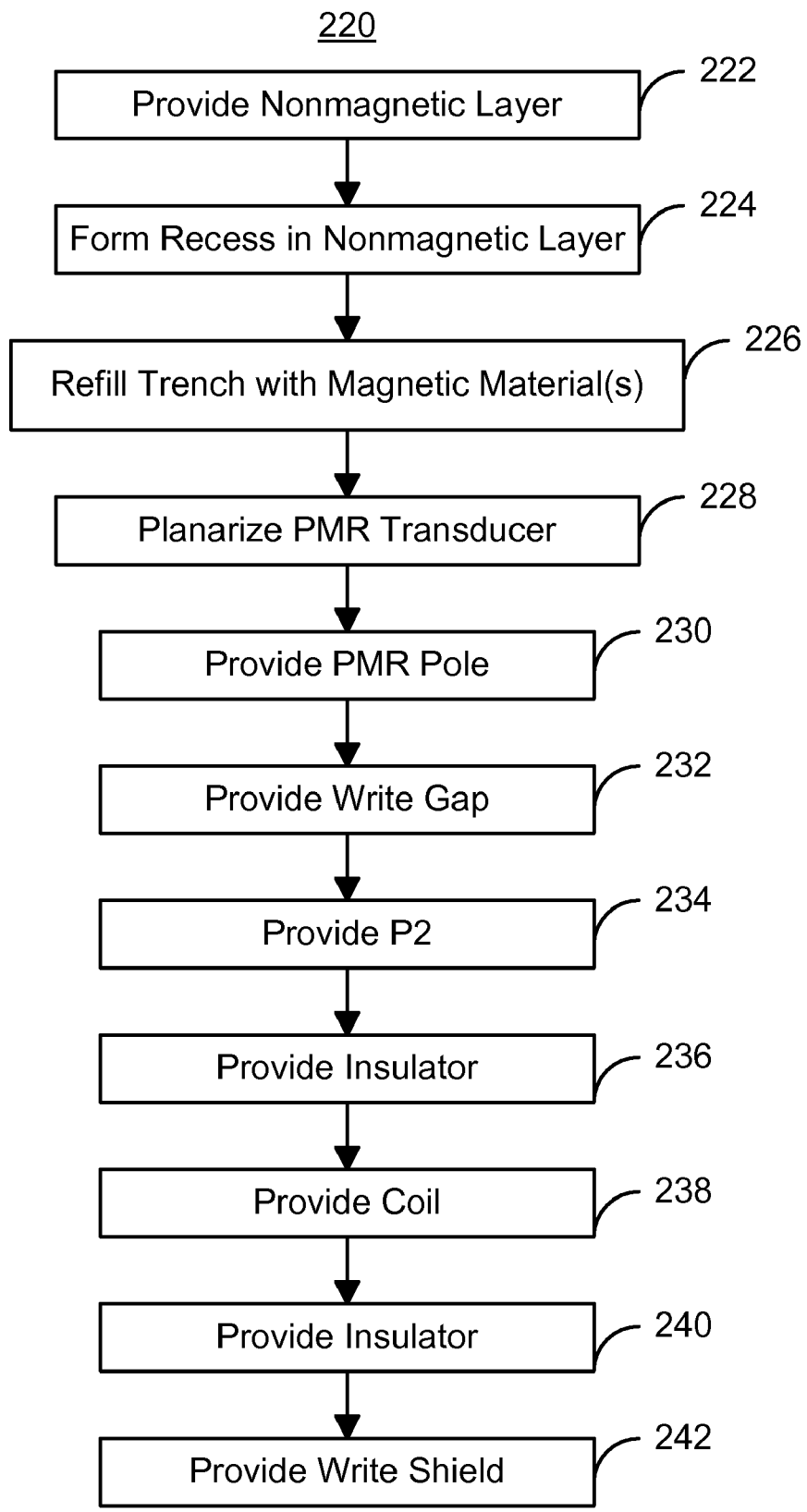
FIG. 5 is a flow-chart depicting another exemplary embodiment of a method for providing a PMR head.

FIG. 5 is a flow-chart depicting another exemplary embodiment of a method 220 for providing a PMR head. For clarity, the method 220 is described in the context of the PMR head 150. For simplicity, some steps of the method 220 may be omitted or combined. Referring to FIGS. 3 and 5, the method 220 commences after formation of the P1 102', coil 104', and insulator 106'.

A nonmagnetic layer is provided, via step 222. The nonmagnetic layer is used in providing the first portion 112' of the base layer 110'. Thus, at least a portion of the nonmagnetic layer is proximate to the ABS. In one embodiment step 222 includes depositing a conductive material, for example including a transition metal. In another embodiment, step 222 includes providing an insulating material. Thus, step 222 might include depositing material(s) including at least one of NiP, NiNb, CoB, NiCr, Ru, and AlOx. In addition, step 222 may include forming a CMP stop layer on the nonmagnetic layer. In one embodiment, therefore, step 222 may include depositing a layer including at least one of Cr, Ta, Ru, and diamond-like carbon.

A portion of the nonmagnetic layer is removed, forming a recess, via step 224. Step 224 may include providing a mask on the nonmagnetic layer, then performing an etch to form a trench in the nonmagnetic layer. The portion of the nonmagnetic layer remaining after step 224 corresponds to the first portion 112' of the base layer 110'. Thus, the recess is formed with an edge proximate to the ABS that is not more than one micron from the ABS. In one embodiment, this edge is not more than two hundred fifty nanometers from the ABS.

The recess is refilled using magnetic material(s), via step 226. Thus, step 226 may include depositing material(s) including at least one of Fe, Co, Ni, and CoFe. In one embodiment, the material(s) used in refilling the trench has a high saturation magnetization. For example, the trench may be refilled with materials(s) having a saturation magnetization of at least one Tesla. In one embodiment, the saturation magnetization of the material(s) used in step 226 does not exceed 2.5 Tesla.

The transducer 100' of the write head 150 is planarized, via step 228. Thus, the base layer 110' having portions 112' and 114' is formed. Furthermore, the base layer 110' has a planar surface, which may improve manufacturability of the PMR pole 116'. In one embodiment, steps 222-228 correspond to step 202 of the method 200 depicted in FIG. 4.

Referring back to FIG. 5, the PMR pole 116' is provided on the base layer 110, via step 230. Step 230 corresponds to step 204 of the method 200. The write gap 120' is provided near the ABS surface, or pole tip, of the PMR pole 116', via step 232.

The P2 118' is provided, via step 234. In one embodiment, step 234 corresponds to step 208 of the method 200. Step 234 includes providing the P2 118' recessed from the ABS and such that at least a portion of the P2 118' resides on the PMR pole 116'. In one embodiment, step 234 also includes providing the portion 124A' of the write shield 124'. In one embodiment, step 234 includes providing a mask on the PMR transducer 100' after formation of the PMR pole 116'. A portion of the mask covers a portion of the magnetic transducer 100' between the ABS and the desired location of the P2 118. In such an embodiment, step 234 includes depositing material (s) for the P2 118' from at least the ABS to at least a desired location of the back of the additional pole. Step 234 would also include lifting off the mask. Consequently, a first remaining portion of the material(s) proximate to the ABS would the portion 124A' of the write shield 124', while a second remaining portion of the material would form the P2 118'. An insulator is provided, via step 236.

The coil 126' is provided, via step 238. The coil 126' is insulated, via step 240. Thus, the coil 126' is insulated such that electrical contact is made not between the P2 118' and the coil 126' nor between the write shield 124' and the coil 126'. The write shield 124' is provided, via step 242. In one embodiment, step 242 includes providing the portion 124B of the write shield.

Thus, using the method 220, a write head, such as the write head 150 including the write transducer 100' may be provided. Consequently, the method 220 may be used to fabricate a write transducer having improved write efficiency and that is better able to be used at higher densities.

Figure 6:
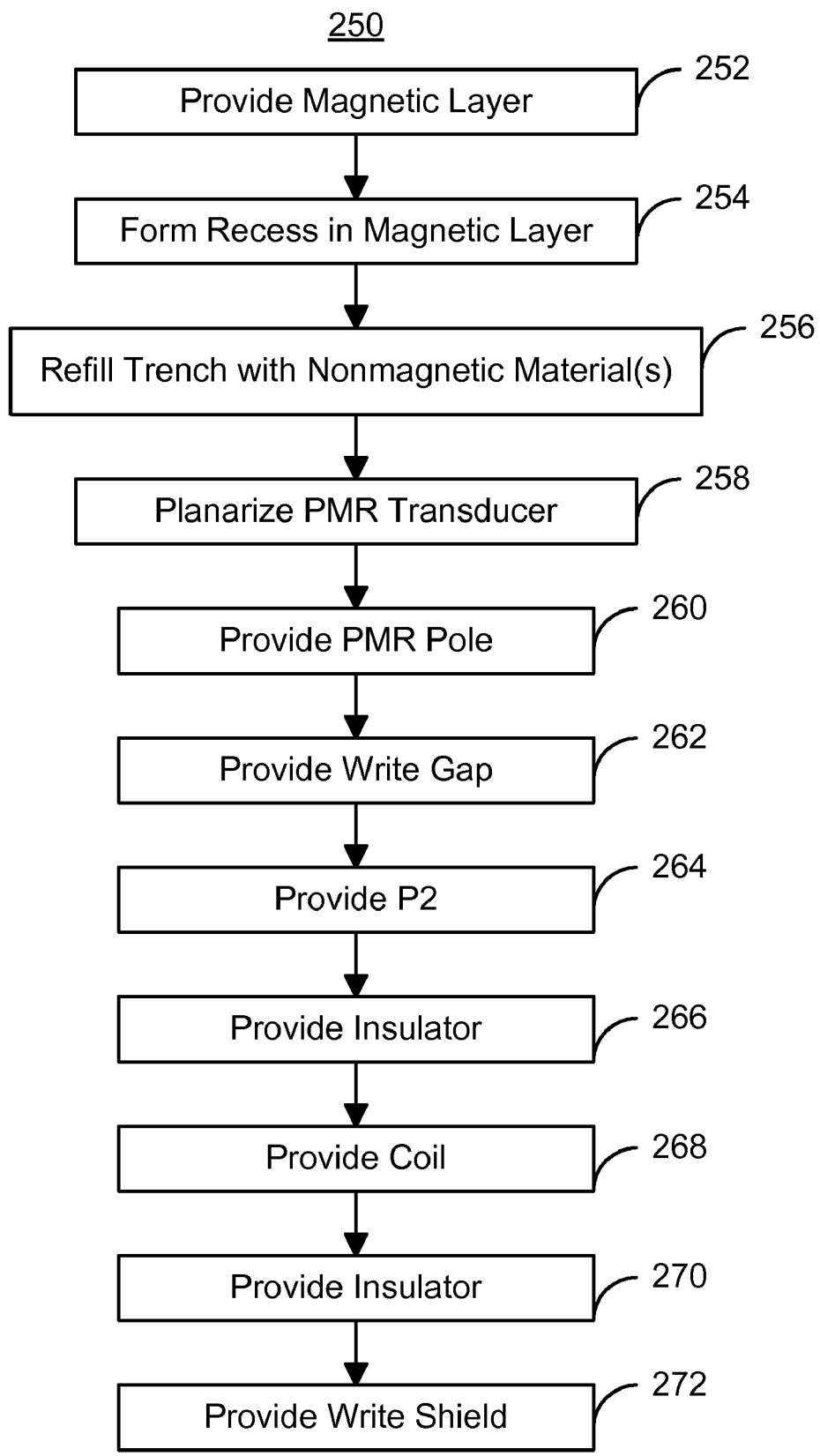
FIG. 6 is a flow-chart depicting another exemplary embodiment of a method for providing a PMR head.

FIG. 6 is a flow-chart depicting another exemplary embodiment of a method 250 for providing a PMR write head. For clarity, the method 250 is described in the context of the PMR head 150. For simplicity, some steps of the method 250 may be omitted or combined. Referring to FIGS. 3 and 6, the method 250 commences after formation of the P1 102', coil 104', and insulator 106'.

A magnetic layer is provided, via step 252. The magnetic layer is used in providing the second portion 114' of the base layer 110'. Thus, step 252 may include depositing material(s) including at least one of Fe, Co, Ni, and CoFe. In one embodiment, the material(s) used in providing the layer has a high saturation magnetization. For example, the layer be formed with materials(s) having a saturation magnetization of at least one Tesla. In one embodiment, the saturation magnetization of the material(s) used in step 252 does not exceed 2.5 Tesla. The magnetic layer may extend from the ABS to at least the back of the base layer 110'.

A portion of the magnetic layer is removed, forming a recess, via step 254. Step 254 may include providing a mask on the magnetic layer, then performing an etch to form a trench in the magnetic layer. The portion of the magnetic layer remaining after step 254 corresponds to the second portion 114' of the base layer 110'. Thus, the recess is formed with one edge at the ABS and another edge that is not more than one micron from the ABS. In one embodiment, this edge is not more than two hundred and fifty nanometers from the ABS. Thus, the recess formed in step 254 is in the location of the first portion 112' of the base layer 110'.

The recess is refilled using nonmagnetic material(s), via step 256. In one embodiment step 256 includes depositing a conductive material, for example including a transition metal. In another embodiment, step 256 includes providing an insulating material. Thus, step 256 might include depositing material(s) including at least one of NiP, NiNb, CoB, NiCr, Ru, and AlOx. In addition, step 256 may include forming a CMP stop layer on the nonmagnetic layer. In one embodiment, therefore, step 256 may include depositing a layer including at least one of Cr, Ta, Ru, and diamond-like carbon.

The transducer 100' of the write head 150 is planarized, via step 258. Thus, the base layer 110' having portions 112' and 114' is formed. Furthermore, the base layer 110' has a planar surface, which may improve manufacturability of the PMR pole 116'. In one embodiment, steps 252-258 correspond to step 202 of the method 200 depicted in FIG. 4.

Referring back to FIG. 6, the PMR pole 116' is provided on the base layer 110, via step 260. Step 260 corresponds to step 204 of the method 200. The write gap 120' is provided near the ABS surface, or pole tip, of the PMR pole 116', via step 262.

The P2 118' is provided, via step 264. In one embodiment, step 264 corresponds to step 208 of the method 200. Step 264 includes providing the P2 118' recessed from the ABS and such that at least a portion of the P2 118' resides on the PMR pole 116'. In one embodiment, step 264 also includes providing the portion 124A' of the write shield 124'. In one embodiment, step 264 includes providing a mask on the PMR transducer 100' after formation of the PMR pole 116'. A portion of the mask covers a portion of the magnetic transducer 100' between the ABS and the desired location of the P2 118. In such an embodiment, step 264 includes depositing material(s) for the P2 118' from at least the ABS to at least a desired location of the back of the additional pole. Step 264 would also include lifting off the mask. Consequently, a first remaining portion of the material(s) proximate to the ABS would the portion 124A' of the write shield 124', while a second remaining portion of the material would form the P2 118'. An insulator is provided, via step 266.

The coil 126' is provided, via step 268. The coil 126' is insulated, via step 270. Thus, the coil 126' is insulated such that electrical contact is made not between the P2 118' and the coil 126' nor between the write shield 124' and the coil 126'. The write shield 124' is provided, via step 272. In one embodiment, step 242 includes providing the portion 124B of the write shield.

Thus, using the method 250, a write head, such as the write head 150 including the write transducer 100' may be provided. Consequently, the method 220 may be used to fabricate a write transducer having improved write efficiency and that is better able to be used at higher densities.

We claim:

1. A magnetic transducer having an air-bearing surface (ABS), the magnetic transducer comprising:
   a base layer including a first portion proximate to the ABS and a second portion recessed from the ABS, the first portion being nonmagnetic, the second portion being magnetic;
   a perpendicular magnetic recording pole having a first front portion proximate to the ABS, the perpendicular magnetic recording pole residing on the base layer, the perpendicular magnetic recording pole having a bottom surface and a top surface opposite to the bottom surface, the bottom surface being adjacent to the base layer; an additional pole recessed from the ABS, a first portion of the additional pole being adjacent to the top surface of the perpendicular magnetic recording pole, a second portion of the additional pole extending further from the ABS than the perpendicular magnetic recording pole;
   a write gap, at least a portion of the write gap residing on the front portion of the perpendicular magnetic recording pole;
   a write shield, the write gap residing between the perpendicular magnetic recording pole and a portion of the write shield, at least a portion of the additional pole residing between the perpendicular magnetic recording pole and the write shield; and
   at least one coil for energizing at least the additional pole.

2. The magnetic transducer of claim 1 wherein the second portion of the base layer has a front residing between the ABS and a front surface of the additional pole.

3. The magnetic transducer of claim 2 wherein the front of the second portion of the base layer is recessed from the ABS by not more than one micron.

4. The magnetic transducer of claim 3 wherein the front of the second portion of the base layer is recessed from the ABS by not more than two hundred fifty nanometers.

5. The magnetic transducer of claim 1 wherein the first portion of the base layer includes at least one of NiP, NiNb, CoB, NiCr, Ru, and AlOx.

6. The magnetic transducer of claim 1 wherein the first portion of the base layer further includes a chemical mechanical planarization stop layer.

7. The magnetic transducer of claim 6 wherein the chemical mechanical planarization stop layer includes at least one of Cr, Ta, Ru, and diamond-like carbon.

8. The magnetic transducer of claim 1 wherein the second portion of the base layer has a high saturation magnetization.

9. The magnetic transducer of claim 8 wherein the high saturation magnetization is at least one Tesla and not more than 2.5 Tesla.

10. The magnetic transducer of claim 8 wherein the second portion of the base layer includes at least one of Fe, Co, Ni, and CoFe.

11. The magnetic transducer of claim 1 wherein the top surface of the perpendicular magnetic recording pole is in contact with the first portion of the additional pole and the perpendicular magnetic recording pole resides between the base layer and the shield.

12. The magnetic transducer of claim 11 further comprising:
   a back gap distal from the ABS, the additional pole extending to the back gap.

13. A magnetic transducer having an air-bearing surface (ABS), the magnetic transducer comprising:
   a base layer including a first portion proximate to the ABS and a second portion recessed from the ABS, the first portion being nonmagnetic, the second portion being magnetic, having a high saturation magnetization and having a front recessed from the ABS by not more than one micron;
   a perpendicular magnetic recording pole having a first front portion proximate to the ABS, a bottom surface and a top surface, the base layer being adjacent to the bottom surface;
   a back gap distal from the ABS;
   an additional pole having a second front portion recessed from the ABS, a first portion of the additional pole being adjacent to and in contact with the to surface of the perpendicular magnetic recording pole, a second portion of the additional pole extending further from the ABS than the perpendicular magnetic recording pole, the second portion of the additional pole extending to the back gap, the front of the second portion of the base layer residing between the ABS and the second front Portion of the additional pole;
   a write gap, at least a portion of the write gap residing on the front portion of the perpendicular magnetic recording pole;
   a write shield, the write gap residing between the perpendicular magnetic recording pole and a portion of the write shield, at least a portion of the additional pole residing between the perpendicular magnetic recording pole and the write shield, the second front of the additional pole being at least 0.25 micrometers from the portion of the write shield, the perpendicular magnetic recording pole residing between the base layer and the shield; and
   at least one coil for energizing at least the additional pole.

14. A head comprising:
   a read transducer; and
   a magnetic write transducer having an air-bearing surface (ABS), the magnetic transducer further including a base layer, a perpendicular magnetic recording pole, an additional pole, a write gap, a write shield, and a coil, the base layer including a first portion proximate to the ABS and a second portion recessed from the ABS, the first portion being nonmagnetic, the second portion being magnetic and having a front, the perpendicular magnetic recording pole having a first front portion proximate to the ABS, the perpendicular magnetic recording pole having a bottom surface and a top surface opposite to the bottom surface, the bottom surface being adjacent to the base layer, the additional pole having a second front portion recessed from the ABS, a first portion of the additional pole being adjacent to the top surface of the perpendicular magnetic recording pole, a second portion of the additional pole extending further from the ABS than the perpendicular magnetic recording pole, the front of the second portion of the base layer being between the ABS and the second front of the additional pole, at least a portion of the write gap residing on the front portion of the perpendicular magnetic recording pole, the write gap residing between the perpendicular magnetic recording pole and a portion of the write shield, at least a portion of the additional pole residing between the perpendicular magnetic recording pole and the write shield, the at least one coil for energizing at least the additional pole; and
   a slider, at least one of the read transducer and the magnetic write transducer residing on the slider.

15. The head of claim 14 wherein the top surface of the perpendicular magnetic recording pole is in contact with the first portion of the additional pole and the perpendicular magnetic recording pole resides between the base layer and the shield.

16. The head of claim 15 wherein the magnetic write transducer further includes:
   a back gap distal from the ABS, the additional pole extending to the back gap.

* * * * *